United States Patent [19]

Suzuki et al.

[11] Patent Number: 4,548,986

[45] Date of Patent: Oct. 22, 1985

[54] UNDERCOATING COMPOSITION

[75] Inventors: Takeshi Suzuki, Nagaokakyo; Seisuke Suzue, Ibaraki, both of Japan

[73] Assignee: Daikin Kogyo Co., Ltd., Japan

[21] Appl. No.: 602,674

[22] Filed: Apr. 23, 1984

[30] Foreign Application Priority Data

Apr. 27, 1983 [JP] Japan .................... 58-75264

[51] Int. Cl.$^4$ .................. C08L 51/00; C08L 77/00
[52] U.S. Cl. .................... 525/66; 525/72; 525/179; 525/180
[58] Field of Search .................. 525/66, 72, 179, 180

[56] References Cited

U.S. PATENT DOCUMENTS

| | | | |
|---|---|---|---|
| 4,011,361 | 5/1977 | Vassiliou et al. | 525/180 |
| 4,139,576 | 2/1979 | Yoshimura et al. | 525/179 |
| 4,326,046 | 4/1982 | Miyaka et al. | 525/276 |
| 4,469,846 | 9/1984 | Khan et al. | 525/72 |

Primary Examiner—John C. Bleutge
Assistant Examiner—A. L. Carrillo
Attorney, Agent, or Firm—Larson and Taylor

[57] ABSTRACT

An undercoating composition for a fluorocarbon polymer coating comprising:

(a) a modified tetrafluoroethylene polymer in the form of particles of double-layer structure having a core and a shell, the core comprising a tetrafluoroethylene homopolymer or a copolymer of tetrafluoroethylene with a fluorine-containing α-olefin, the shell comprising a copolymer of tetrafluoroethylene and said fluorine-containing α-olefin copolymerized therewith in a larger amount than in the core, (b) a copolymer of tetrafluoroethylene and said fluorine-containing α-olefin, and (c) an auxiliary adhesive agent selected from the group consisting of polyimide, polybismaleimide, polyamideimide and aromatic polyamide.

5 Claims, No Drawings

UNDERCOATING COMPOSITION

This invention relates to an undercoating compositions for fluorocarbon resin coating.

Conventional methods of applying fluorocarbon resin coating compositions to aluminum or like substrates include a well-known method which comprises applying an undercoating composition to the substrate first, drying the undercoat composition, baking said composition when desired, further coating the undercoat with a composition called an overcoating enamel, and baking the overcoat composition.

The undercoating composition is usually in the form of an aqueous dispersion comprising a mixture of a tetrafluoroethylene homopolymer, a tetrafluoroethylene copolymer, an auxiliary adhesive agent and additives. When the overcoating enamel is baked, the heat fuses the polymers of the undercoat, permitting said polymers to firmly adhere to the rough-surfaced substrate owing to an anchoring effect and also to form a molten mixture with part of the overcoating enamel. Thus, the undercoating composition has the function of causing a tough coating to be formed on the substrate.

To produce an enhanced fusion effect and afford improve adhesion, the undercoating composition usually contains, in addition to a tetrafluoroethylene homopolymer, a tetrafluoroethylene copolymer such as tetrafluoroethylene/hexafluoropropylene copolymer.

The tetrafluoroethylene copolymer has the effect of lowering the softening point of the undercoating composition. The larger the proportion of the copolymer incorporated in the composition, the lower is the softening point, giving improved melt flow characteristics to the composition.

However, when the proportion increases, the softening point of the fluorocarbon resin coating formed from the undercoating and overcoating enamel also lowers consequently, so that if the coating is formed on articles for use at a relatively high temperature, for example, on frying pans, the coating exhibits reduced strength and becomes no longer satisfactorily serviceable when exposed to heat of high temperature during use.

Accordingly, in order to reinforce the coating for use at high temperatures, it was attempted to incorporate into undercoating compositions finely divided inorganic additives such as colloidal silica having particle sizes of 10 to 20 μm to form coatings having strength against high temperatures as contemplated. However, since a majority of these inorganic additives are hydrophilic, it was found that the hydrophilic substance, when present in the coating, readily permits penetration of water or the like into the coating, causing corrosion to the substrate of aluminum or the like to give rise to blisters.

Thus, undercoating compositions still remain to be developed which give fluorocarbon resin coatings good adhesion, high corrosion resistance and sufficient strength against high temperatures. It has therefore been desired to provide undercoating compositions which are satisfactory in all of these three characteristics.

Accordingly we have carried out intensive research on undercoating compositions having these properties and found that an undercoating composition incorporating a modified tetrafluoroethylene polymer having a specific particle structure and substituting for the tetrafluoroethylene homopolymer has good adhesion to aluminum or like substrates and to overcoat enamels even when not containing a large amount of a tetrafluoroethylene copolymer. We have further found that this composition retains the fluorocarbon resin coating on the substrate with high bond strength at high temperatures even when not containing inorganic additives. These findings have matured to the present invention.

An object of the present invention is to provide an undercoating composition for a fluorocarbon resin coating.

Another object of the invention is to provide a method for applying the undercoating composition which gives fluorocarbon polymer coatings good adhesion to substrates, high strength against high temperatures to high resistance to corrosion.

The present invention provides an undercoating composition for a fluorocarbon polymer coating, comprising:

(a) a modified tetrafluoroethylene polymer in the form of particles of double-layer structure having a core and a shell, the core comprising a tetrafluoroethylene homopolymer or a copolymer of tetrafluoroethylene with a fluorine-containing α-olefin represented by the formula $CF_2=CFR$ 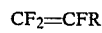

wherein R is a member selected from the group consisting of chlorine, and perfluoroalkyl, polyfluoroalkyl, perfluoroalkyloxy and polyfluoroalkyloxy each having 1 to 10 carbon atoms, and said alkyl or alkyloxy groups may have one or more oxygen atom in their chain, the shell comprising a copolymer of tetrafluoroethylene and the fluorine-containing α-olefin copolymerized therewith in a larger amount than in the core, (b) a copolymer of tetrafluoroethylene and the fluorine- containing α-olefin uniformly copolymerized therewith, and (c) an auxiliary adhesive agent selected from the group consisting of polyimide, polybismaleimide, polyamideimide and aromatic polyamide.

The term "modified tetrafluoroethylene polymer" herein used refers to the polymer (a). This polymer can be prepared in the presence of an anionic or nonionic surfactant in an aqueous medium by polymerizing tetrafluoroethylene or copolymerizing tetrafluoroethylene with the fluorine-containing α-olefin to form a seed polymer first, and subsequently copolymerizing tetrafluoroethylene with the fluorine-containing α-olefin to form a shell around the seed polymer. The modified tetrafluoroethylene polymer contains the fluorine-containing α-olefin in an amount of 0 or up to 4% by weight in the core and up to 7% by weight in the shell, and the olefin content of the shell is greater than that of the core. The modified polymer is 0.15 to 0.6 μm in average primary particles size. The core of the modified polymer particle means the center portion of the particle which occupies about 70% of the whole weight of the particle. The dispersion of polymer particles obtained is used usually as concentrated to a particle content of 40 to 70% by weight.

Examples of fluorine-containing α-olefin useful for forming the seed polymer are $CF_2=CClF$, $CF_2=CFOCF_3$ 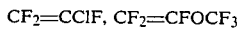

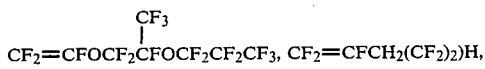
CF$_2$=CFOCF$_2$CFOCF$_2$CF$_2$CF$_3$, CF$_2$=CFCH$_2$(CF$_2$)$_2$)H, etc., among which CF$_2$=CClF$_3$ is preferred.

The modified tetrafluoroethylene polymer to be used in this invention can be any of those disclosed in Published Unexamined Japanese Patent Applications Nos. SHO 51-36291, SHO 51-130494 and SHO 52-5890.

Like usual undercoating compositions, the undercoating composition of the present invention further has incorporated therein a tetrafluoroethylene copolymer which is prepared by uniformly copolymerizing 70 to 90% by weight of tetrafluoroethylene with 10 to 30% by weight of the fluorine-containing α-olefin in an aqueous medium. The resulting dispersion is used usually as concentrated to a copolymer particle content of 40 to 60% by weight. The copolymer is 0.1 to 0.4 μm in average primary particle size. Exemplary of the fluorine-containing α-olefin to be copolymerized are CF$_2$=CFCF$_3$, CF$_2$=CFOCF$_3$,

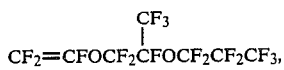

etc., amoung which CF$_2$=CFCF$_3$ is preferred.

The modified tetrafluoroethylene polymer and the tetrafluoroethylene copolymer are used in a ratio of 5 to 25 parts of weight, preferably 10 to 15 parts by weight, of the former per part by weight of the latter. When the amount of the modified polymer is less than 5 parts by weight, the resulting undercoat will not have good adhesion to the substrate, whereas if the amount exceeds 25 parts by weight, the undercoat will have reduced strength at high temperatures.

The undercoating composition of the invention further has incorporated therein an auxiliary adhesive agent such as polyamideimide, polybismaleimide, polyamideimide, aromatic polyamide or the like. The auxiliary adhesive agent is used in an amount of 0.1 to 20 parts by weight per part of the combined amount of the modified tetrafluoroethylene polymer and the tetrafluoroethylene copolymer. Examples of useful polyimides are compounds of the formula

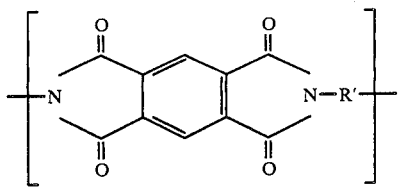

wherein R' is

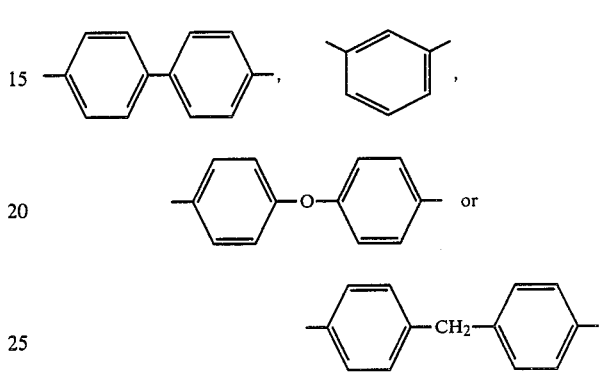

Exemplary of useful polybismaleimide is the compound of the formula

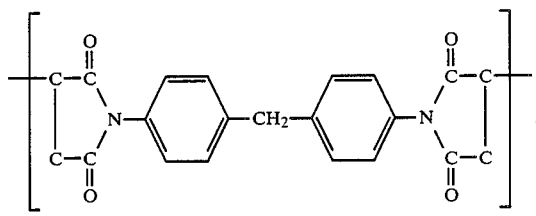

Examples of useful polyamideimides are compounds which are obtained by reacting trimellitic acid with an aromatic diamine, such as

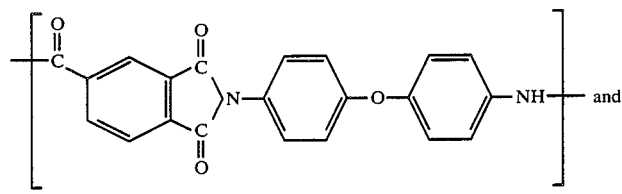 and

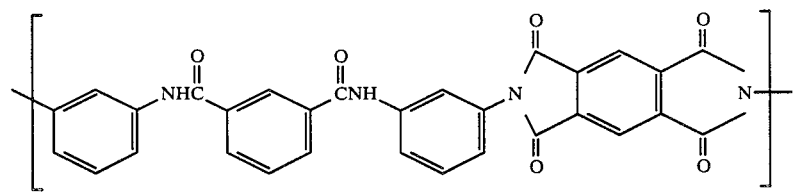

Examples of useful aromatic diamines are 4,4'-diaminobenzanilide, 4,3'-diaminobenzanilide, 3,4'-diaminobenzanilide, 3,3'-diaminobenzanilide, 3,5'-diaminobenzanilide, isophthal(4-aminoanilide), N,N'-m-phenylenebis(4-aminobenzamide), isophthal(3-aminoanilide), N,N'-bis(3-aminobenzoyl), 2,4-diaminodiphenyl ether, 2,4-diaminophenyl ether, N,O-bis(3-aminobenzoyl)-p-aminophenol and bis(4-aminophenyl)isophthalic acid ester. Examples of useful aromatic polyamides are

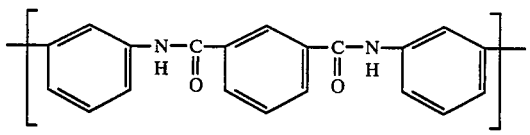

and

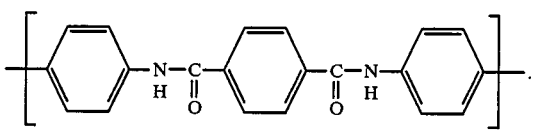

The undercoating composition of the present invention is prepared by mixing together the modified tetrafluoroethylene polymer dispersion and tetrafluoroethylene copolymer dispersion thus obtained, adding the auxiliary adhesive agent to the mixture, and stirring the resulting mixture into a uniform dispersion. When the modified tetrafluoroethylene polymer and the tetrafluoroethylene copolymer are prepared by a process other than emulsion polymerization, these ingredients can also be made into an aqueous dispersion for like use. The auxiliary adhesive agent is used usually in an amount of 0.1 to 20 parts by weight per part by weight of the combined amount of the modified tetrafluoroethylene polymer and the tetrafluoroethylene copolymer. When the amount is less than 0.1 part by weight, the resulting coating will not intimately adhere to the substrate satisfactorily, whereas if it is in excess of 20 parts by weight, the coating will exhibit poor adhesion to the overcoat.

Coloring agents, leveling agents, stabilizers, tackifiers, etc. can further be admixed with the undercoating composition of the invention.

The present undercoating composition is applied to sandblasted or otherwise treated surfaces of metal, glass, porcelain and like articles by a usual method such as spray, flow or brush coating, and the coating is then dried by an infrared dryer or the like. When required, the coating may be baked subsequently. Preferably the undercoat has a thickness of 5 to 15 μm when dried. The undercoat can be coated with an overcoating enamel in the usual manner, followed by baking. The undercoating composition of the invention, which is used for the same application as usual fluorocarbon resin coating compositions, has the advantage that it is usable especially for articles which are used at relatively high temperatures. For example, the present composition is useful for conveyor belts, ladles for caramel, baking molds for crackers, etc. in the food industry, for frying pans, rice cookers, hot plates and like cooking utensils, and further for heat sealers, plastics molds, irons, etc.

The present invention will be described in greater detail with reference to the following examples and comparison examples.

EXAMPLES 1 TO 9

A dispersion (particle content: 60% by weight) of modified tetrafluoroethylene polymer (containing no α-olefin in the seed polymer) shown in Table 1, a dispersion (particle content: 50% by weight) of tetrafluoroethylene copolymer (fluorine-containing α-olefin: 15% by weight of hexafluoropropylene) and a polyamideimide resin (aqueous solution containing 20% by weight of solids) were uniformly mixed together into a dispersion to obtain an undercoating composition of the invention.

With use of a spray gun (nozzle diameter: 1 mm, pressure: 2–3 kg/cm²), the composition was applied for several seconds to an aluminum panel (150 mm×70 mm×2 mm) over a sandblasted surface thereof (abrasive: energy #80, pressure: 5–6 kg/cm²). The coated aluminum panel was dried by an infrared dryer (80°–90° C.), then cooled to room temperature and thereafter coated with an overcoating fluorocarbon resin enamel ("ES-5109BK", product of Daikin Kogyo Co., Ltd.) over the resulting undercoat by a spray gun in the same manner as above and then baked in an electric oven at 380° C. for 15 minutes. The overcoated aluminum panel was dried by the same infrared dryer as above and then baked in an electric oven at 80° C. for 15 minutes. After baking, the undercoat and the overcoat were found to have thicknesses of 10 μm and 12 μm, respectively, by a high-frequency eddy-current film thickness gauge. The fluorocarbon resin coating (hereinafter referred to as "sample") on the aluminum panel was tested by the following methods. Table 1 shows the results.

(a) Pencil hardness test

Conducted according to JIS K6894. In Table 1, "room temp." refers to a test conducted at room temperature, "200° C." refers to a test conducted with the sample heated at 200° C., "hot water" refers to a test conducted after immersing the sample in hot water of at least 90° C. for 100 hours and cooling the sample to room temperature, and "hot oil" refers to a test conducted after immersing the sample in lard of 260° C. for 16 hours and cooling the sample to room temperature.

(b) Article test

Conducted for aluminum frying pans provided with the same fluorocarbon resin coating as the above sample.

In the Table 1, "bran frying" refers to a test conducted by placing 200 cc of rice bran, 50 cc of soy sauce, 20 cc of salad oil and a teaspoonful of common salt into the frying pan, heating the mixture to dryness with stirring by wood spatula, repeating these steps 50 times and thereafter checking the coating for damage. The results were evaluated according to the following criteria.

:No flaw.
Δ:Slight flaws.
X:Serious flaws.

"Corrosion" in Table 1 refers to a test conducted by dissolving 20 g of soy sauce in 1 liter of water, placing the solution into the frying pan, heating the solution at 80° C. for 72 hours and thereafter checking the coating for blisters. The results were evaluated according to the following criteria.

:No blisters.
Δ:Slight blisters.
X:Marked blisters.

COMPARISON EXAMPLES 1 TO 3

A dispersion of tetrafluoroethylene homopolymer shown in Table 1, a dispersion of tetrafluoroethylene compolymer (same as the one used in Examples), polyamideimide resin (same as the one used in Examples) and an inorganic additive (colloidal silica containing about 20% by weight of silicic anhydride and 10 to 20 μm in particle size) were mixed together into a uniform undercoating dispersion in the same manner as in Example 1.

In the same manner as in Example 1, this undercoating composition was applied to aluminum panels and aluminum frying pans, and the coatings were tested by the same methods as above. Table 1 shows the results.

different as in the case of (a) uniformly copolymerized therewith, and
(c) about 0.1 to 20 parts by weight per part by weight of the combined amount of the modified tetrafluoroethylene polymer (a) and tetrafluoroethylene copolymer (b) of an auxiliary adhesive agent selected

TABLE 1

| | Undercoating composition | | | | | | |
|---|---|---|---|---|---|---|---|
| | Modified TFE*1 polymer dispersion | | | | Amount of TFE*1 copolymer*3 | Amount of polyamide-imide resin*3 | Amount of inorganic additive*3 |
| | TFE*1 seed polymer*2 | α-olefin in shell | | Amount*3 | | | |
| | | Kind | Amount*2 | | | | |
| Ex. | | | | | | | |
| 1 | 70 | CF$_2$=CClF | 0.1 | 170 | 17 | 180 | 0 |
| 2 | 70 | CF$_2$=CClF | 0.2 | 170 | 17 | 180 | 0 |
| 3 | 70 | CF$_2$=CClF | 0.5 | 170 | 17 | 180 | 0 |
| 4 | 70 | CF$_2$=CClF | 0.6 | 170 | 17 | 180 | 0 |
| 5 | 70 | CF$_2$=CClF | 0.25 | 155 | 30 | 180 | 0 |
| 6 | 70 | CF$_2$=CClF | 0.25 | 170 | 17 | 180 | 0 |
| 7 | 70 | CF$_2$=CClF | 0.25 | 175 | 10 | 180 | 0 |
| 8 | 70 | CF$_2$=CFOCF$_3$ | 0.25 | 170 | 17 | 180 | 0 |
| 9 | 70 | CF$_2$=CFCH$_2$(CF$_2$)$_2$H | 0.25 | 170 | 17 | 180 | 0 |
| Comp. Ex. | | | | | | | |
| 1 | None (note) | None | None | None | 17 | 180 | 0 |
| 2 | " | " | " | " | 17 | 180 | 10 |
| 3 | " | " | " | " | 0 | 180 | 10 |

| | Test results | | | | | |
|---|---|---|---|---|---|---|
| | Pencil hardness | | | | Article | |
| | Room temp. | 200° C. | Hot water | Hot oil | Bran frying | Corrosion |
| Ex. | | | | | | |
| 1 | H | HB | HB | HB | | |
| 2 | H | F | F | HB | | |
| 3 | H | F | HB | HB | | |
| 4 | H | F | HB | HB | | |
| 5 | F | HB | HB | HB | | |
| 6 | H | F | F | HB | | |
| 7 | H | F | HB | HB | | |
| 8 | H | F | F | HB | | |
| 9 | H | F | F | HB | | |
| Comp. Ex. | | | | | | |
| 1 | HF | 2B | 2B | 2B | X | |
| 2 | F | 2B | B | 2B | Δ | Δ |
| 3 | F | F | 2B | 2B | | X |

Note:
In Comparison Examples 1 to 3, the dispersion of modified tetrafluoroethylene polymer was replaced by 170 parts by weight of a dispersion of tetrafluoroethylene homopolymer (60% by weight of polymer particles in the dispersion).
*1tetrafluoroethylene,
*2wt. % based on primary particles
*3wt. parts

We claim:
1. An undercoating composition for a fluorocarbon polymer coating comprising:
(a) about 5 to 25 parts by weight per part by weight of the tetrafluroethylene copolymer (b) of a modified tetrafluoroethylene polymer in the form of particles of double-layer structure having a core and a shell wherein the core occupies about 70% of the whole weight of the particle, the core comprising a tetrafluoroethylene homopolymer or a copolymer of tetrafluoroethylene with a fluorine-containing α-olefin represented by the formula

CF$_2$=CFR wherein R is a member selected from the group consisting of chlorine, and perfluoroalkyl, polyfluoroalkyl, perfluoroalkyloxy and polyfluoroalkyloxy each having 1 to 10 carbon atoms, and the alkyl or alkyloxy groups may have one or more oxygen atom in their chain, the shell comprising a copolymer of tetrafluoroethylene and said fluorine-containing α- olefin copolymerized therewith in a larger amount than in the core,
(b) a copolymer of tetrafluoroethylene and said fluorine-containing α-olefin which can be the same or different as in the case of (a) uniformly copolymerized therewith, and from the group consisting of polyimide, polybismaleimide, polyamideimide and aromatic polyamide.

2. An undercoating composition as defined in claim 1 wherein the modified tetrafluoroethylene polymer contains the fluorine-containing α-olefin in an amount of 0 or up to 4% by weight in the core and up to 7% by weight in the shell, and the olefin content is greater in the shell than in the core.

3. An undercoating composition as defined in claim 2 wherein the modified tetrafluoroethylene polymer contains none of the fluorine-containing α-olefin in the core and contains up to 2% by weight of the fluorine-containing α-olefine in the shell.

4. An undercoating composition as defined in claim 1 wherein the copolymer of tetrafluoroethylene (b) contains 10 to 30% by weight of the fluorine-containing α-olefin.

5. An undercoating composition as defined in claim 1 which comprises 10 to 15 parts by weight of the modified tetrafluoroethylene polymer per part by weight of the copolymer of tetrafluoroethylene.

* * * * *